United States Patent [19]
Beaumont

[11] 3,801,750
[45] Apr. 2, 1974

[54] APPARATUS FOR DUPLICATING MAGNETIC TAPES AND APPLYING CUE INDICIA TO THE NON-RECORDING SURFACE OF THE SLAVE TAPE

[76] Inventor: Alan Beaumont, 359 Wildwood Rd., Stamford, Conn. 06903

[22] Filed: Sept. 14, 1972

[21] Appl. No.: 288,947

Related U.S. Application Data

[63] Continuation of Ser. No. 93,969, Dec. 1, 1970, abandoned.

[52] U.S. Cl. ........... 360/15, 179/100.1 VC, 360/79, 360/134

[51] Int. Cl. ............................................ G11b 5/86

[58] Field of Search ........... 179/100.1 VC, 100.2 A, 179/100.2 B, 100.2 E, 100.2 S

[56] References Cited

UNITED STATES PATENTS

| | | | |
|---|---|---|---|
| 2,976,372 | 3/1961 | Sampson | 179/100.2 E |
| 2,932,696 | 4/1960 | Shipman | 179/100.2 S |
| 2,677,728 | 5/1954 | Kolb et al. | 179/100.2 B |

*Primary Examiner*—Daryl W. Cook
*Assistant Examiner*—Robert S. Tupper
*Attorney, Agent, or Firm*—Colton & Stone, Inc.

[57] ABSTRACT

The disclosure introduces a method and apparatus for the continuous recording and application of cue indicia to magnetic recording tape.

Printing roller means are constantly rotated at a linear velocity equal to that of a magnetic tape in the process of being recorded from a master tape and in closely spaced relation to the non-recording surface thereof. The printing roller means is momentarily brought into contact with the non-recording magnetic tape surface to imprint cue indicia thereon at those discrete intervals between recorded selections and as a function of the positionment of such intervals adjacent the printing roller means.

10 Claims, 7 Drawing Figures

INVENTOR
ALAN BEAUMONT

BY Calton & Stone
ATTORNEYS.

INVENTOR
ALAN BEAUMONT

BY Colton & Stone

ATTORNEYS.

INVENTOR
ALAN BEAUMONT

BY Colton & Stone

ATTORNEYS.

APPARATUS FOR DUPLICATING MAGNETIC TAPES AND APPLYING CUE INDICIA TO THE NON-RECORDING SURFACE OF THE SLAVE TAPE

This is a continuation, of application Ser. No. 93,969, filed Dec. 1, 1970, and now abandoned.

CROSS-REFERENCE TO RELATED APPLICATION

The cue indicia applied in accordance with the method and apparatus herein disclosed is adapted for direct viewing while being transported within a "cassette" type tape cartridge in accordance with the invention disclosed in U.S. Pat. application, Ser. No. 79,189 filed Oct. 8, 1970, now U.S. Pat. No. 3,672,604 granted June 24, 1972.

BACKGROUND OF THE INVENTION

In the aforementioned application is disclosed a direct viewing system to enable the user of a magnetic tape cartridge to ascertain from the positionment of cue markings applied to the nonrecording surface of a magnetic tape, the conventional "pause" intervals between recorded selections whereby a particular selection may be readily selected as the tape is undergoing high speed transport between reels.

Audio tapes used for the recording and play back of multiple program selections, whether configured for transport between reels or in a single reel "Moebius loop" arrangement, are characterized by a common problem; that of locating a particular recorded program among the multiple recorded selections. The limitations and disadvantages inherent in the prior art methods of marking the recording surface of the tape for ready viewing and the use of spliced plastic cues for the same purpose is fully set out in the aforestated application of the same inventor and reference may be had thereto for a more detailed discussion which points out the advantages in the use of cue indicia printed on the non-recording tape surface.

Conventional pre-recorded tapes, such as those destined for use in "cassette" type cartridges for example, are normally recorded from a "master" tape at a very high speed relative to their normal playing speed. Thus, most "cassette" cartridge tapes are recorded at thirty inches per second as opposed to their normal playing speed of one and seven-eighths inches per second. The interruption of this high speed recoring process after each recorded selection to apply cue markings such as by a spliced plastic cue strip or the like would, of course, defeat the high speed recording purpose. Accordingly, the application of conventional cue markings has not achieved commercial acceptance and the user of a typical tape cartridge is left in reliance upon a visual approximation of program selection as through the normal viewing window of the cartridge as a function of index markings and approximate reel pay-out; all as more fully explained in the aforestated application.

SUMMARY OF THE INVENTION

The invention resides in the application of cue markings at those non-recorded "pause" intervals between recorded tape selections contemporaneously with the high speed recording of the same.

Continuously rotating printing roller means are maintained at a linear speed (30 i.p.s.) equal to that of the tape being recorded and in closely spaced relation thereto. The printing roller is activated as a function of, and brought into printing contact with, those tape intervals intermediate recorded programs.

One method of activating the printing means involves the recording of an inaudible signal (such as 20 i.p.s. for example) on the master tape continuous over the normal "pause" interval between the audibly recorded program selections. A play back head tuned for the frequency of the inaudible signal is then positioned adjacent the tape being recorded and may be adjacent the conventional record head which is used to record the program selections as a duplicate of the master tape. As the inaudible low frequency signal is picked up, the printing means is activated to imprint the tape during that interval during which the signal is received which corresponds with the normal inter-program pause interval.

The printing means are automatically repositionable, as a function of each imprinting motion, to bring a different set of printing elements into printing position whereby each pause interval is differently cued as by different numerals, colors or the like.

DETAIL DESCRIPTION OF THE PREFERRED EMBODIMENT

Figure 1:
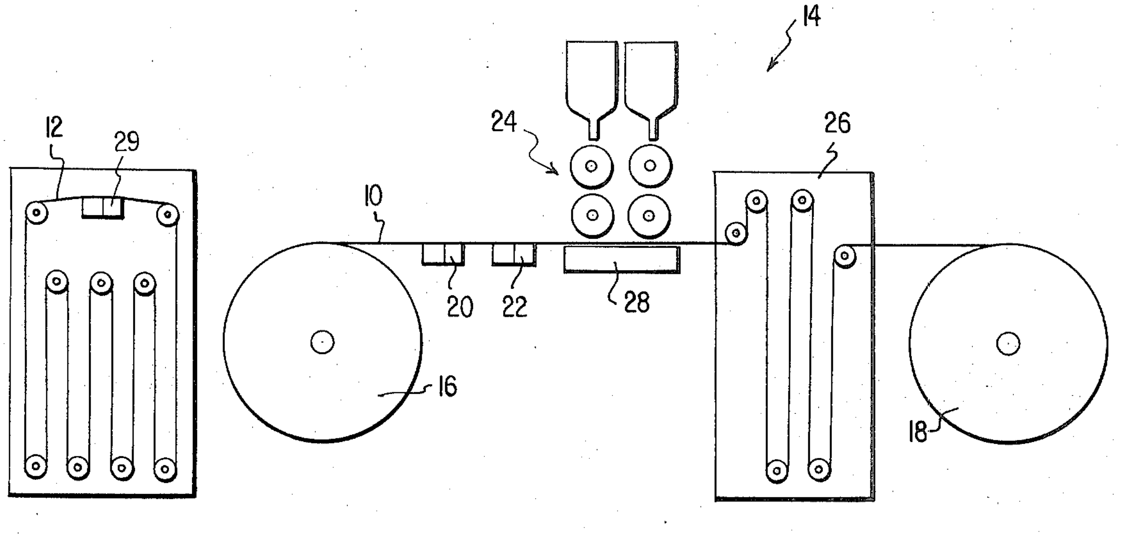
FIG. 1 is a schematic illustration of a system for recording and cue marking a magnetic tape.

In FIG. 1 is schematically illustrated the recording of a magnetic tape 10 from a master tape 12 and the manner in which cur marking may be applied intermediate conventionally recorded selections.

The preparation of the master tape is entirely conventional with the single exception that a signal outside and audible range is recorded on the master tape at the normal "pause" intervals intermediate the usual audibly recorded program selections. This may be effected in any desired manner such as by the activation of a sonic relay and low frequency record head as a function of audible signal termination as during that interval between recorded selections. Desirably, the inaudible signal will be recorded within the "pause" intervals at the time the master tape is prepared though it is obvious that a pre-recorded master tape may be so inaudibly recorded to convert the same into one suitable for the practice of the invention. Although a single slave tape is illustrated as being recorded and marked in accordance with the practice of the invention, it will be understood that a plurality of slave tape record and marking stations 14 are normally associated with a master tape 12 to produce a multiplicity of slave recordings at the same time. It will be further obvious that the presence of the inaudible signal on the master tape in no way affects its use in a conventional slave recording system where the cue marking is not applied.

The record and marking station 14 includes pay-out and take-up reels 16, 18 for the continuous seriatim transport of tape 10 past record, sensing, marking and drying stations 20, 22, 24, 26. A suitable length of master tape 12 is transported in any desired manner past a play back head 29 which is suitably connected in a manner not illustrated in the drawings with the slave tape record head 20. The usual synchronized high speed transport of the slave and master tapes thus results in the duplication of the master tape recording on the slave tape which, in the case of the instant invention, also results in the recording of the inaudible signal at the "pause" intervals on the tape 10. It is the manner in which these inaudibly recorded pause intervals may be used to insure that the non-recording surface of the tape is visibly marked that is the more specific aspect of the invention. In a broader sense, any desired manner of sensing the pause interval between recorded selections could be used to activate the marking means.

Basically, as tape 10 is transported, program selections are recorded thereon at record head 20 as are the inaudible recordings between the audibly recorded selections. When one of the inaudibly recorded intervals passes over sensing station 22, in the form of a limited sensitivity play back head which is responsive to the inaudible signal, a sonic relay is activated which, in turn ,initiates a marking operation at the marking station to visibly mark the non-recording surface of tape 10 at the particular "pause" interval detected at the sensing station. When sensing head 22 no longer detects the inaudible signal, as when another audibly recorded selection is passing thereacross, the sonic relay and printing station are deactivated. Assuming for simplicity of illustration the recording and cue marking of a single track tape, the manner in which the foregoing is accomplished will become more apparent from the following detailed description of FIGS. 2 – 7 wherein the tape 10 is illustrated as moving from right to left rather than from left to right as in FIG. 1.

Figure 2:
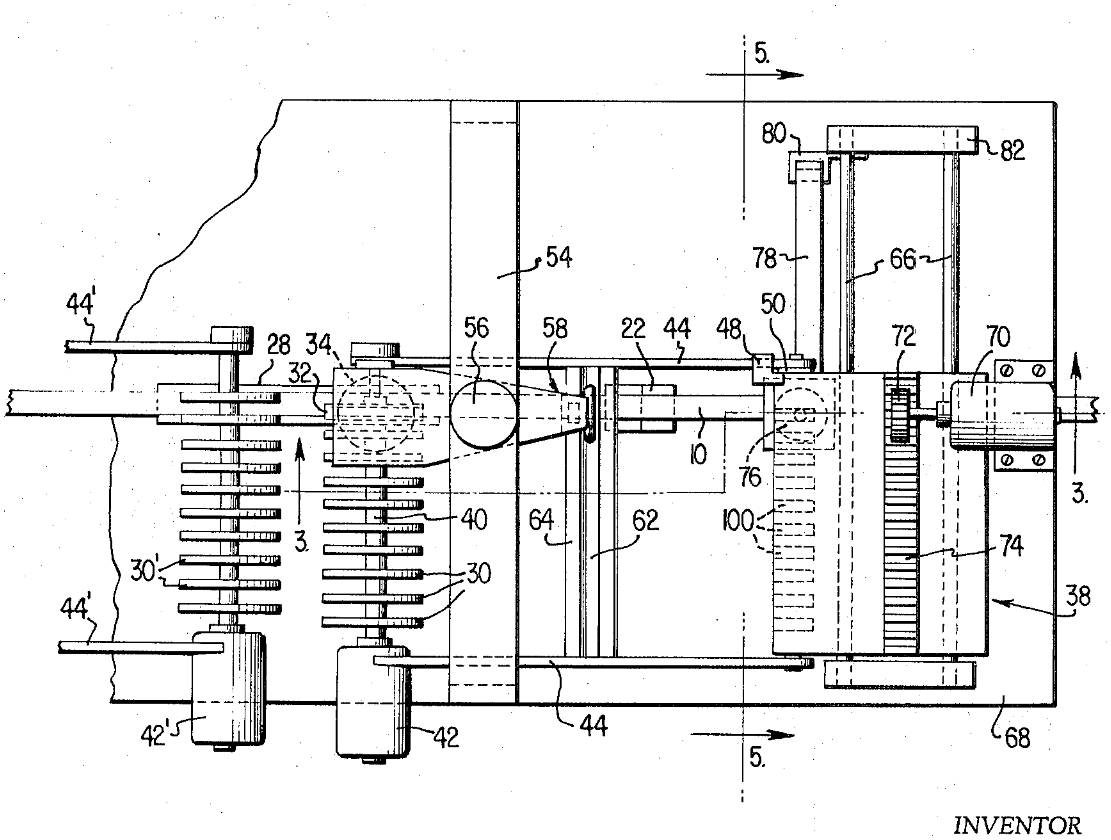
FIG. 2 is a top plan view illustrating mechanism employed at the cue marking station.
Figure 3:
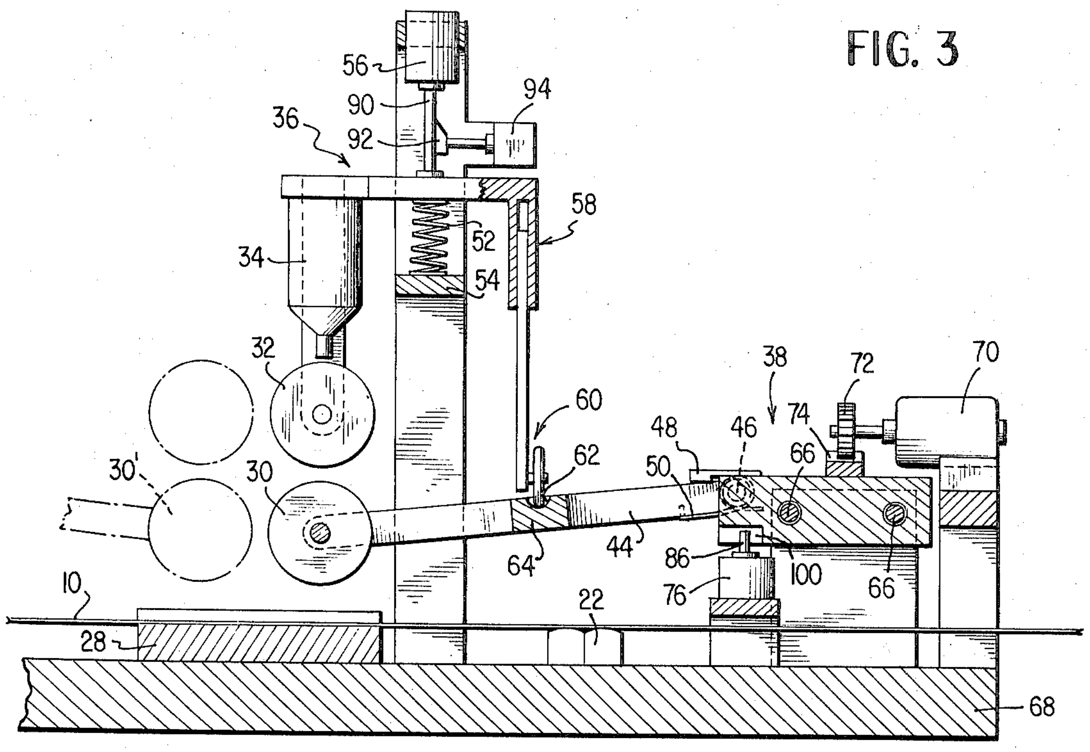
FIG. 3 is a sectional view taken along line 3—3 of FIG. 2.
Figure 4:
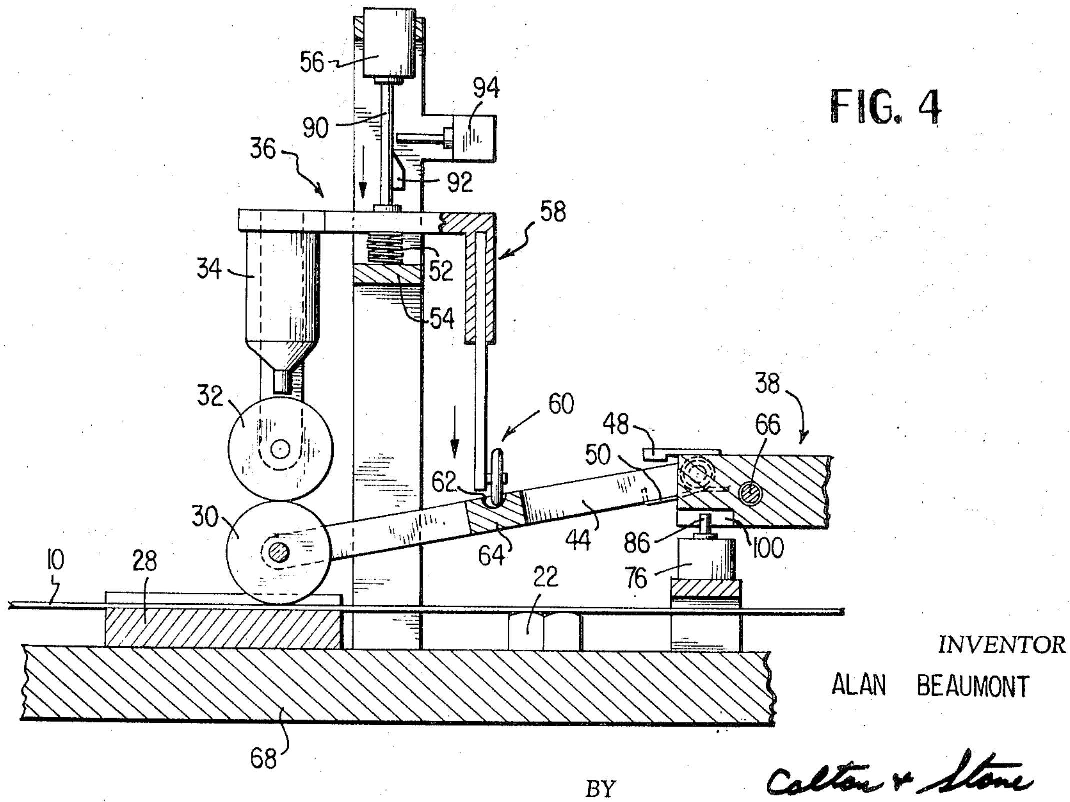
FIG. 4 is a view similar to FIG. 3 but illustrating an imprinting operation.

The marking station is illustrated substantially in its entirety in FIGS. 2 and 3 and includes a printing block 28, a plurality of printing rollers 30, inking transfer rollers 32, printing ink reservoirs 34, a printing pressure control assembly 36 and a movable carriage 38.

Printing rollers 30 are constantly rotated through a common shaft 40 at a linear speed equal to that of tape 10 by an electric motor 42 operated from any convenient power supply, not shown. The printing rollers as well as motor 42 are mounted at the distal ends of arms 44 for limited vertical movement relative to printing block 28 about pivots 46 between the non-printing position of FIG. 3 wherein arms 44 are bised upwardly against abutment 48 carried by carriage 38 under the influence of torsion springs 50 and the lower printing position of FIG. 4. Printing pressure control assembly 36 is mounted for limited vertical movement between the positions of FIGS. 3 and 4 under the opposed influences of a compression spring 52, reacting between a fixed frame support 54 and assembly 36, and a solenoid actuator 56. The transfer roller and ink supply are carried by assembly 36 which further includes a lost motion connection 58 with roller assembly 60 engaging a track 62 formed in a strut 64 rigidly bridging arms 44.

Carriage 38 is mounted for traversing movement parallel to the axis of shaft 40 on guide rods 66, integrally supported on frame 68, under the influence of an electric motor 70, mounted on frame 68, whose output shaft is fitted with pinion 72 engaging a rack 74 on the carriage. Carriage 38 is adapted for discrete stepping movement in one direction as controlled by a solenoid controlled carriage lock assembly 76 and for continuous rapid return in the other direction. The manner in which this is accomplished will become apparent from an inspection of FIGS. 5 and 6 wherein an extension 78 on carriage 38 is positioned to open a double acting toggle switch 80 mounted on frame member 82 when the carriage is in one extreme position and an abutment 84 closes the same at the other extreme position of travel. When switch 80 is closed plunger 86 of lock assembly 76 is withdrawn and motor 70 is continuously driven to move carriage 38 from the position of FIG. 6 to that of FIG. 5 at which time switch 80 is opened by extension 78. With the switch open, motor 70 and lock assembly 76 are sequentially activated and deactivated as a function of the vertical position-ment of assembly 36 and the activation of sonic relay 88 which, in turn, respond to the sensing of an inaudible signal at the limited sensitivity play back head 22. With reference to FIG. 7 it will be seen that the closure of relay switch 88 results in the extension of plunger 90 of solenoid 56 which plunger includes an integral microswitch actuator 92 for closing the normally open switch 94 when solenoid 56 is deactivated as in the FIG. 7 circuit condition. A conventional pulse generator 96 which acts in the manner of a capacitor to store a charge when switch 94 is open discharges the same to motor 70 and solenoid 76 upon a subsequent closure of switch 92 as solenoid 56 is deenergized to assume the position of FIG. 7.

Figure 5:
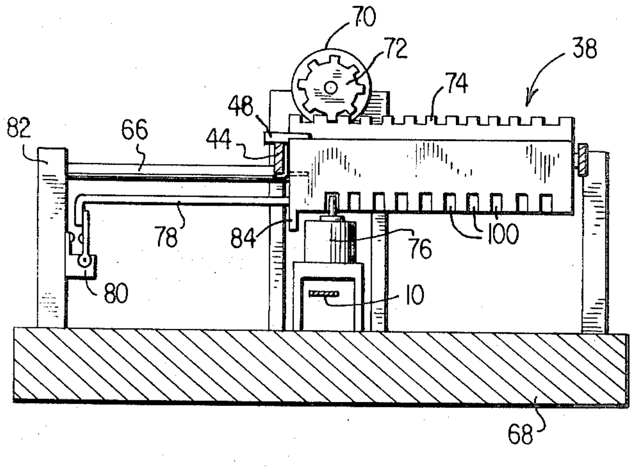
FIG. 5 is a sectional view taken along line 5—5 of FIG. 2.

In operation, and assuming the initial carriage position of FIG. 5, the printing pressure control assembly position of FIG. 3 and the circuit condition of FIG. 7 with tape 10 being transported between reels 16 and 18 and an audible program selection being recorded at head 20; the cue marking operation is initiated as a "pause" interval having recorded therein an inaudible signal reaches the limited sensitivity play back head 22. The output from head 22 activates sonic relay 88 to bring power supply 98 in circuit with solenoid 56 to extend plunger 90. The extension of plunger 90 overrides spring 52 to bring transfer roller 32 into inking contact with the rotating printing roller 30 overlying die 28. This initial downward movement of assembly 36 is not transmitted to roller assembly 60; the same being taken up in lost motion connection 58. This insures that the printing roller will be properly inked before it is brought into printing engagement with the upper non-recording, surface of tape 10 which is backed against die 28. Further downward movement of plunger 90 forces roller assembly 60 downward to overcome the bias of torsion springs 50 and move arms 44 downwardly thus bringing printing roller 30 into printing contact with tape 10. Simultaneously with the extension of plunger 90, switch 94 opened as abutment 92 moved out of engagement therewith and pulse generator 96 was charged during the tape imprinting interval defined by that period of time during which relay 88 is activated. Upon cessation of the inaudiable signal at head 22 as another audibly recorded selection passes thereacross, the sonic relay is deactivated to open the circuit between power source 98 and solenoid 56. Plunger 90 is thus retracted closing switch 94 and bringing the now charged pulse generator into circuit with carriage motor 70 and the locking assembly solenoid 76. The momentary energization of solenoid 76 results in the withdrawal of locking plunger 86 from locking spaces 100 defined between a plurality of closely spaced cogs on carriage 38 simultaneously with the energization of stepper motor 70 to translate carriage 38 to the right as viewed in FIG. 5. Solenoid 76 may, if necessary, include a conventional one-way dash pot to momentarily retard return of the plunger to the extended position following the momentary energization thereof by pulse generator 96. This is to insure that plunger 86 will be held in the retracted position for a sufficient periof of time to allow motor 70 to initiate movement of the carriage while the plunger is withdrawn. In any event, whether a time delay mechanism is employed or the operating characteristics of solenoid 76 are so chosen, the critical factor is that plunger 86 be withdrawn sufficiently long as not to reengage the previous locking space 100 while insuring its return extension immediately after the previous locking space has moved out of alignment therewith. The stepper motor itself may be chosen to impart the correct incremented travel to carrigage 38; i.e., to the next inter-cog space and the extension of plunger 86 merely locks the carriage against movement during the printing operation. This restores the circuit condition of FIG. 7 with a second printing roller 30 now in position to imprint tape 10 upon a subsequent energization of sonic relay 88 as a subsequent inaudible signal is detected at sensing station 22. Each printing roller is, of course, coded in a different manner as by numerals or the like to facilitate a rapid visual determination of the particular inter-program "pause" interval.

Figure 6:
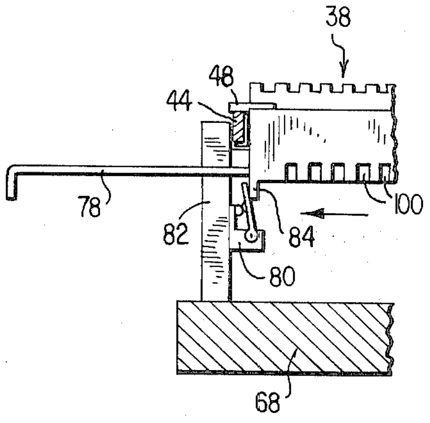
FIG. 6 is a fragmentary detail view thereof illustrating a different carriage position.
Figure 7:
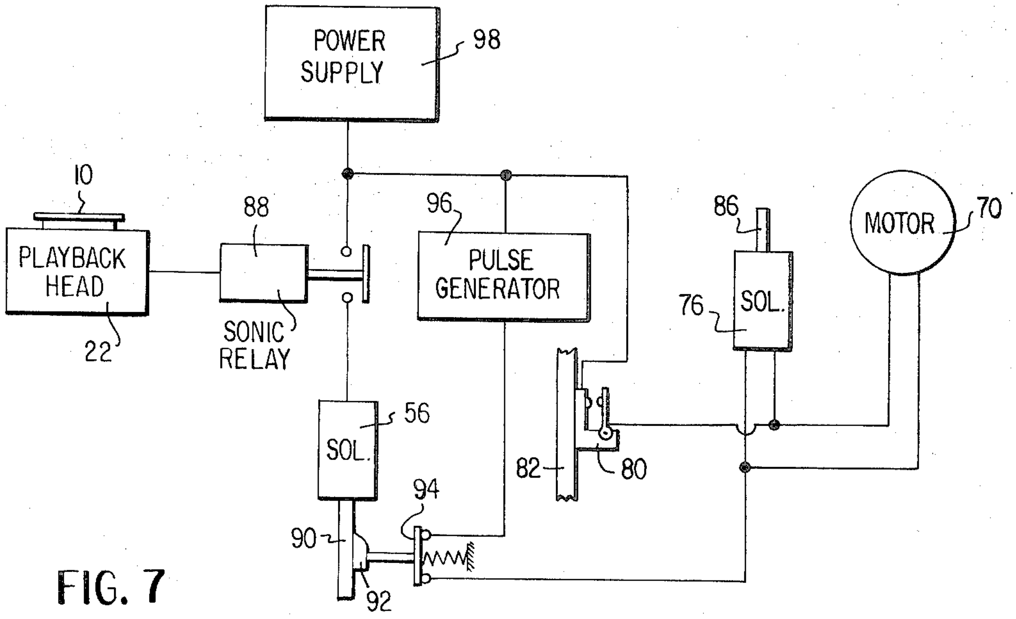
FIG. 7 is a diagram of the circuitry that may be employed in th practice of the invention.

When carriage 38 reaches the leftmost position of FIG. 6 which will normally signal the complete tape recording; abutment 84 closes switch 80 to complete a direct circuit from power supply 98 to solenoid 76, holding plunger 86 retracted, and motor 70 to drive carriage 38 to the position of FIG. 5 at which time extension 78 opens switch 80 and the cyclic printing operation just described are ready for repetition.

Auxiliary printing rollers 30′ may be provided if a double track tape is being recorded. These auxiliary rollers are staggered, within one tape width, with respect to a corresponding roller 30 and are operated in the same manner to mark the other half width of tape 10 not marked by rollers 30. The control of printing rollers 30′ is the same as that described in connection with rollers 30 and is not illustrated beyond the fragmentary showing of support arms 44′ and motor 42′.

I claim:

1. Apparatus for audio recording a sequence of spaced audio program selections from a master recording medium along a recording path on a moving elongate slave recording medium and contemporaneously applying a cue marking in the interval between each selection without interrupting the movement of said slave recording medium comprising web transport means for moving said slave recording medium along a web transport path, recording means positioned along said web transport path for recording said audio program selections from said master recording medium in spaced sequence along a recording path on said slave recording medium, sensing means positioned along said web transport path to sense said moving slave recording medium after passage thereof past said recording means, said sensing means operating to sense the occurrance of an interval between sequential audio program selections recorded upon said slave recording medium and to provide a mark control signal in response to each sensed interval, and cue generating means positioned along said web transport path and operative in response to a mark control signal from said sensing means to mark said slave recording medium to indicate the sensed interval between program selections which initiates said mark control signal, said cue generating means including marking means for marking said slave recording medium and mark control means responsive to said mark control signal to activate said marking means.

2. The apparatus of claim 1 wherein said sensing means is responsive to an inaudible signal recorded by said recording means from said master recording medium on said slave recording medium in the intervals between said sequential audio program selections.

3. The apparatus of claim 1 wherein said marking means is mounted adjacent to said web transport path but opposite to said recording and sensing means, said marking means operating to mark the nonrecorded side of said slave recording medium.

4. The apparatus of claim 1 wherein said cue generating means operates to apply a cue marking in each interval between audio program selections on said slave recording medium which is distinctive from at least the preceding and succeeding cue markings applied thereby.

5. The apparatus of claim 4 wherein said cue generating means includes a carriage means mounted for transversing movement across said slave recording medium in a direction substantially normal to said web transport path, said carriage means being adapted for discrete stepping movement in at least one direction, and carriage drive means for moving said carriage for one stepping increment after each activation of said marking means, said marking means being mounted upon said said carriage means for movement therewith.

6. The apparatus of claim 4 wherein said marking means includes a pluarlity of printing rollers mounted closely adjacent to said web transport path for selective engagement with said slave recording medium and driving means for rotating said printing rollers at a linear speed substantially equal to the speed of movement of said slave recording medium along said web transport path, said mark control means operating to cause different printing rollers to mark said slave recording medium in response to successive mark control signals.

7. The apparatus of claim 6 wherein said web transport means operates to move said slave recording medium along said web transport path at a speed greater than the normal playing speed for said recorded audio program selections.

8. The apparatus of claim 6 wherein said mark control means includes a carriage means mounted for traversing movement across said slave recording medium in a direction substantially normal to said web transport path, said carriage means being adapted for discrete stepping movement in at least one direction and carriage drive means for moving said carriage for one stepping increment after each activation of said marking means, said printing rollers being mounted on said carriage means for movement therewith and for movement into and away from engagement with said slave recording medium.

9. The apparatus of claim 8 wherein said marking means includes mounting means for mounting said printing rollers in a line transverse to said web transport path and relatively spaced for a distance substantially equal to one stepping increment of of said carriage means, said mounting means being secured to said carriage means for movement relative thereto toward said web transport path, said mark control means including printing pressure means operative in response to the reception of a mark control signal by said mark control means to move said mounting means toward said web transport path to bring said printing rollers into contact with said slave recording medium.

10. The apparatus of claim 9 wherein said cue generating means includes inking means mounted adjacent said line of printing rollers for applying marking material to a printing roller moved to a marking material reception position relative to said inking means by said carriage means.

* * * * *

UNITED STATES PATENT OFFICE
CERTIFICATE OF CORRECTION

Patent No. 3,801,750 Dated April 2, 1974

Inventor(s) Alan Beaumont

It is certified that error appears in the above-identified patent and that said Letters Patent are hereby corrected as shown below:

Column 2, line 41, "th" should read --the--.

Column 2, line 47, "cur" should read --cue--.

Column 2, line 51, "and" should read --the--.

Column 4, line 8, after "with" and before "pinion", --a-- should be inserted.

Column 4, line 25, "position-ment" should read --positionment--.

Column 4, line 37, "92" should read --94--.

Column 4, line 57, after "upper" a comma should be inserted.

Column 5, line 19, "periof" should read --period--.

Claim 5, line 2, "transversing" should read --traversing--.

Claim 6, line, 2, "pluarlity" should read --plurality--.

Signed and sealed this 22nd day of October 1974.

(SEAL)
Attest:

McCOY M. GIBSON JR.
Attesting Officer

C. MARSHALL DANN
Commissioner of Patents